March 17, 1970      H. E. GRANT      3,500,488

CAR WASH BRUSH

Filed Aug. 8, 1968

INVENTOR
HOWARD E GRANT
BY
Friedman & Goodman
ATTORNEYS

United States Patent Office 3,500,488
Patented Mar. 17, 1970

3,500,488
CAR WASH BRUSH
Howard E. Grant, % Trans-World Car Wash Systems, Inc., 65 Marine St., Farmingdale, N.Y. 11735
Filed Aug. 8, 1968, Ser. No. 751,110
Int. Cl. B60s *3/06*
U.S. Cl. 15—21       7 Claims

ABSTRACT OF THE DISCLOSURE

For use in a car or automobile washing unit in the operation of which an automobile is moved along a prescribed path in association with various apparatus for cleaning different parts of the automobile, a fender and side panel washer including at least one brush mounted on a C-shaped support frame having an initial cleaning position projected into the path of movement and a subsequent cleaning position extending in substantial alignment with the car path of movement and wherein the bottom of the brush is movable out of the plane of the support so that in the subsequent cleaning position it has a favorable inclination for making cleaning contact with the side panel of the car, particularly the rocker panel located along the car bottom and inclined inwardly towards the car chassis.

---

Figures 1, 2:
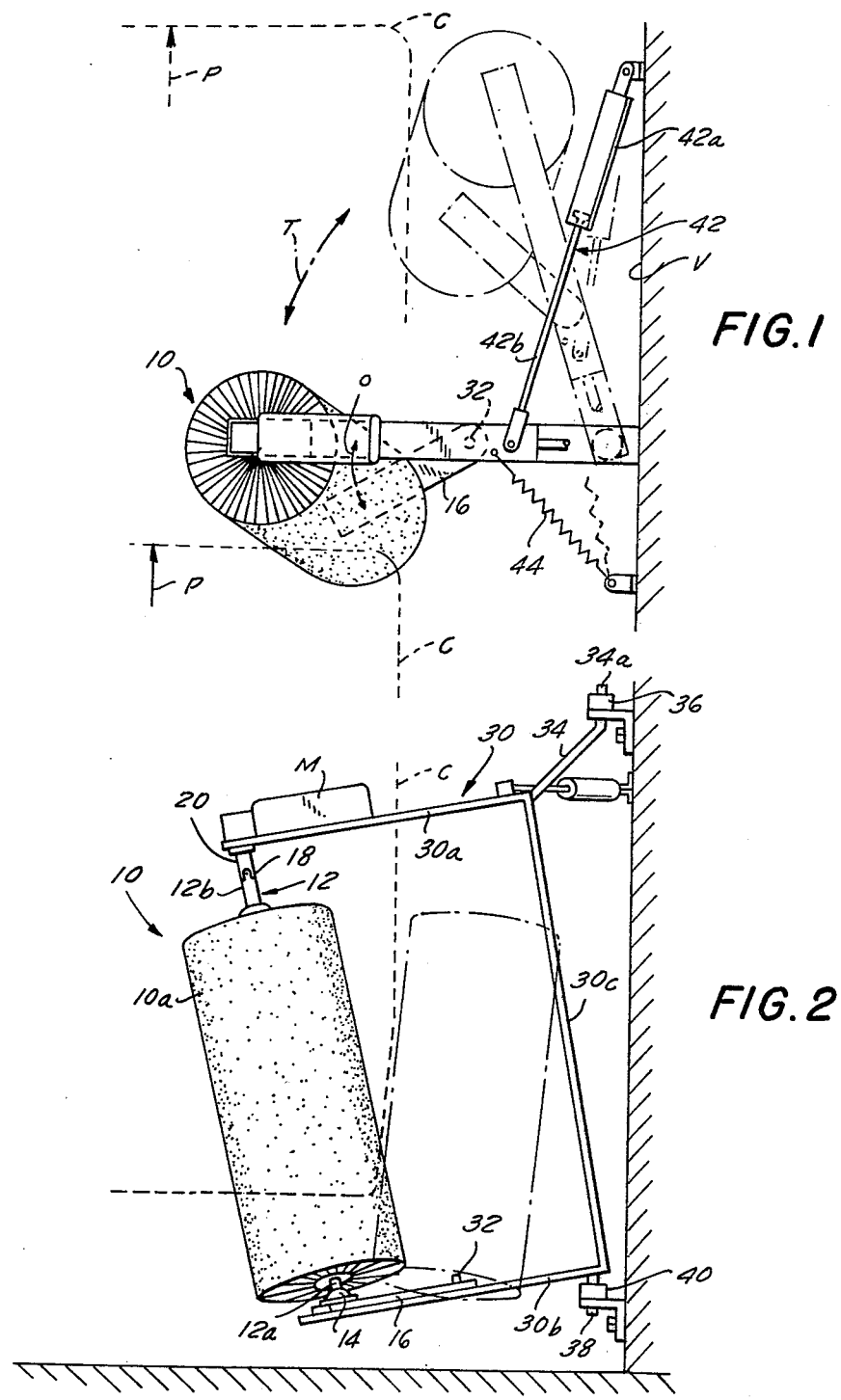

The present invention relates generally to automobile washing units in the operation of which use is made of various apparatus intended for cleaning different parts of the automobile, and more particularly to an improved automobile fender and side panel washer.

In current use are numerous embodiments of automobile washing units which have in common a mode of operation wherein the automobile is urged along a path of movement in association with different apparatus strategically located and designed to clean a different part of the automobile. Consistent with the popularity and proven commercial acceptance of these units, there is a continuing effort by equipment manufacturers to provide improved car cleaning apparatus, particularly that designed to clean the side of the automobile and the so-called "rocker panel" thereof, a part which due to its location along the bottom side of the car and also because of its usual inclined angle towards the car chassis is somewhat inaccessible to cleaning contact by the cleaning brush. The obvious solution of using a permanently favorably inclined cleaning brush is not satisfactory unless there is also provided some means of moving the brush into cleaning contact with the bottom side of the car as the car moves into position alongside of the brush. Alternatively, the cleaning brush may have a clearance position permitting movement of the car alongside of it and an extensive portion extending laterally into the car path of movement which at its extending or free end makes cleaning contact with the car. In this alternate solution, however, there is a lack of support or contact pressure between the extending or free end of the brush and car and thus the contact affected does not provide a desired vigorous scrubbing action.

Broadly, it is an object of the present invention to provide an improved automobile fender and side panel washer overcoming the foregoing and other shortcomings of the prior art. Specifically, it is an object to provide a cleaning brush having an initial and a subsequent cleaning position and in each of these positions has the proper and favorable position and orientation for cleaning the designated portion of the car which is then advantageously presented for cleaning.

An automobile fender and side panel washer demonstrating objects and advantages of the present invention includes a substantially planar C-shaped support having the cleaning brush appropriately journaled for rotation in the opening of the support, the support being pivotally mounted so as to be movable from an initial cleaning position, in which it is projected transversely of and into the car path of movement, into a subsequent cleaning position, in which the support is substantially aligned with the car path of movement, the brush and support further including means for moving the bottom of the brush out of the plane of the support so that in the subsequent cleaning position the lower portion of the brush is inclined towards the path of movement and is thus favorably oriented to make cleaning contact with the automobile rocker panel.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings wherein:

FIG. 1 is a plan view of a car wash cleaning brush according to the present invention wherein significant positions of movement thereof are illustrated in full line and phantom line perspective; and FIG. 2 is a front elevational view illustrating further details of the brush and of the angled orientations thereof in its different positions of movement.

Reference is now made to the drawings wherein there is shown a rotary car wash brush, generally designated 10, which is designed specifically to clean the car front and rear fenders and side, particularly the so-called "rocker panel" which is located along the bottom side of the car and usually has a slight inclination towards the car chassis making cleaning contact with the same somewhat difficult. The car wash with which the brush 10 is intended to be used is of the type having means for moving an automobile or car C along a prescribed path of movement P in association with apparatus for cleaning different parts of the car, one such apparatus being the rotary brush 10. Characteristic of this type of car wash, movement of the car C along the path of movement P brings the car into cleaning contact with the cleaning apparatus and specifically against the brush 10, this contact between the car and brush further resulting in pivotal movement of the brush 10 from a starting cleaning position, illustrated in full line in FIG. 1, through a pivotal traverse T, illustrated in phantom perspective also in FIG. 1. Thus, the brush 10, in its starting cleaning position and by virtue of its projection into the car path of movement P is in an advantageous position to make cleaning contact with the front fender area of the car C; whereas the subsequent cleaning position of the brush 10 is one in which it is both in an advantageous position and orientation to make cleaning contact with the side of the car, particularly the previously noted rocker panel, and also the rear fender area.

The rotary brush 10 will be understood to generally be of conventional construction and made of usual materials of construction which provide a cleaning body 10*a* appropriately mounted on a central longitudinal shaft 12, the lower extending end 12*a* of which is conventionally accommodated in a bearing 14 affixed to a pivotal support 16. The upper shaft end 12*b* is connected via a universal joint 18 to a drive shaft 20 of a motor M which is operatively effective to power the brush 10 in rotation.

Serving as a mounting for the brush 10 is a C-shaped support, generally designated 30, formed by an upper leg 30*a*, a lower leg 30*b*, and an intermediate connecting leg 30*c*, the brush 10 being appropriately journaled for rotation in the front opening of the support 30 between the upper and lower legs 30*a*, 30*b*. The previously noted motor M is advantageously supported on the upper leg 30a with its drive shaft 20 depending therefrom through an appropriate opening in the upper leg 30a into a position adjacent the upper shaft end 12b, the confronting ends of the shafts 20, 12b having the usual interfitting knuckles and connecting pivot pin which provide the universal joint 18.

The pivotal movements of the universal joint 18 are exemplary of a degree of movement, as contemplated by the present invention, by which movement of the lower brush end 12a out of the plane of the support 30 is facilitated, the out-of-plane movement O resulting from pivotal movement of the previously noted support 16 about the pivot 32. Specifically, as best shown in FIG. 1, it is possible to move the bottom of the brush out of the plane of the support 30 by pivoting the bottom support 16 about the pivot 32, while the upper end of the brush is held in the plane of the support 30, at least at the universal joint 18, and, as a consequence, thereby provide the brush body 10a with a slightly inclined orientation with respect to the plane of the support frame 30. The significance of this will soon be apparent.

Each cleaning unit consisting of the support frame 30 and the brush 10 is required to be mounted, as already noted, so that the brush 10 is initially projected into the car path of movement P. To insure contact between the car C and brush 10 in this initial cleaning position of the unit, the upper portion of the brush is advantageously inclined towards the path of movement P to compensate for any pivotal movement that may have been provided the bottom of the brush as a result of movement of the support 16. This is achieved simply by arranging the support 30 at an appropriate inclined angle relative to the vertical support V as illustrated in FIG. 2. Specifically, the support 30 is provided with a comparatively long bracket 34 having a turned-up end 34a accommodated in a wall-mounted bearing 36 and a short depending lower bracket 38 appropriately accommodated in a wall-mounted bearing 40 and, while thusly inclined to the vertical the support 30 is thereby pivotally movable about a longitudinal axis through the bearings 36, 40. This pivotal traverse T, as already noted, results from contact of the brush 10 by the car C during its movement along the path of movement P and is from the starting laterally extending cleaning position of the brush 10 to the subsequent partially rotated or turned cleaning position thereof, these two significant positions being respectively illustrated in full line and phantom line perspective in FIG. 1. By a comparison of the phantom line perspective views of brush 10 in FIGS. 1 and 2, it will be readily apparent that in the subsequent cleaning position of the brush 10, the lower portion of the brush is closer to the car path of movement than the upper portion since, the support frame 30 in this latter position has been turned into substantial alignment with the path of movement P and further since the brush bottom 12a has previously been projected out of the plane of the support 30 by movement of the support 16, thus moving the brush bottom 12a closer to the path P. As a consequence, the brush 10 is obviously at a favorable inclined angle to make cleaning contact with the rocker panel located along the bottom side of the automobile.

The pivotal traverse T of the brush 10 is yieldingly opposed by a conventional hydraulic cylinder arrangement 42 including a cylinder housing 42a connected at one end to the vertical support V and a piston rod 42b operating within the cylinder 42a and connected at its free end to the upper support leg 30a. As generally understood, retraction of the rod 42b within the cylinder 42a results in a pressure build-up which in turn is effective to yieldingly oppose the pivotal traverse T and thus hold the brush 10 against the car C during this pivotal traverse. After the car has passed the brush, a return spring 44 connected at opposite ends to the upper leg 30a and to the vertical support V returns the brush and support unit 10, 30 to the brush starting cleaning position preparatory to cleaning contact with the next car being processed through the car wash.

What is claimed is:

1. For use in an automobile washing unit of the type having means for moving an automobile along a prescribed path of movement in association with cleaning apparatus, an automobile fender and side panel washer comprising a substantially planar C-shaped support formed by an upper leg, a lower leg and a medial connecting leg operatively oriented with the opening between said upper and lower legs facing said automobile path of movement, a cleaning brush journaled for rotation in said opening between said support upper and lower legs, first pivotal mounting means operatively mounting said support in a prescribed orientation adjacent said automobile path of movement for an operative pivotal traverse during a cleaning interval from a starting cleaning position projected into said automobile path of movement into a subsequent cleaning position located alongside of said automobile path of movement, said support prescribed orientation being an angle of inclination effective to project the upper portion of said cleaning brush into said automobile path of movement, and second pivotal mounting means connected between said support lower leg and the lower portion of said cleaning brush effective upon a pivotal traverse towards said automobile path of movement to hold said cleaning brush lower portion at selected inclinations to the plane of said support, whereby said inclined cleaning brush is adapted to make cleaning contact with said automobile side panel in said support subsequent cleaning position.

2. An automobile fender and side panel washer as defined in claim 1 including a longitudinal shaft for said cleaning brush, a motor having a depending drive shaft adapted to power said cleaning brush in rotation, and a pivotal connection between adjacently located ends of said brush longitudinal shaft and said motor drive shaft effective to facilitate pivotal adjustment of said second pivotal mounting means.

3. An automobile fender and side panel washer as defined in claim 2 wherein said second pivotal mounting means is arranged with said pivotally movable end thereof adjacent said automobile path of movement.

4. An automobile fender and side panel washer as defined in claim 3 including movement-controlling means operatively connected to said support to yieldingly oppose said pivotal traverse thereof so as to hold said cleaning brush in cleaning contact with said automobile during said pivotal traverse.

5. For use in an automobile washing unit of the type having means for moving an automobile along a prescribed path of movement in association with cleaning apparatus, an automobile fender and side panel washer comprising a substantially planar C-shaped support formed by an upper leg, a lower leg and a medial connecting leg operatively oriented with the opening between said upper and lower legs facing said automobile path of movement, a cleaning brush and a support shaft therefor journaled for rotation in said opening between said support upper and lower legs, first pivotal mounting means operatively mounting said support in a prescribed orientation adjacent said automobile path of movement for an operative pivotal traverse during a cleaning interval from a starting cleaning position projected into said automobile path of movement into a subsequent cleaning position located alongside of said automobile path of movement, said first pivotal mounting means including an upper support bracket of a comparatively greater extent than a lower support bracket such that said prescribed orientation is an angle of inclination effective to project the upper portion of said cleaning brush into said automobile path of movement, a motor for powering said cleaning brush having a depending drive shaft supported on said upper leg, a universal connection between said brush support shaft and said motor drive shaft, and second pivotal mounting means connected between said support lower leg and the lower portion of said cleaning brush effective upon a pivotal traverse towards said automobile path of movement to hold said cleaning brush lower portion at selected inclinations to the plane of said support, whereby said inclined cleaning brush is adapted to make cleaning contact with said automobile side panel in said support subsequent cleaning position.

6. An automobile fender and side panel washer as defined in claim 5 wherein said second pivotal mounting means is arranged with said pivotally movable end thereof adjacent said automobile path of movement.

7. An automobile fender and side panel washer as defined in claim 6 including an hydraulic cylinder and piston rod means operatively connected to said support to yieldingly oppose said pivotal traverse thereof so as to hold said cleaning brush in cleaning contact with said automobile during said pivotal traverse.

References Cited

UNITED STATES PATENTS 1,951,129   3/1934   Coffey _____ 15—53

EDWARD L. ROBERTS, Primary Examiner

U.S. Cl. X.R.

15—53